United States Patent [19]
Barrow

[11] 3,756,412
[45] Sept. 4, 1973

[54] REMOVING CONTAMINANTS FROM A FLUID STREAM

[76] Inventor: George E. Barrow, 1609 Field Dr., Enid, Okla. 73701

[22] Filed: Dec. 2, 1971

[21] Appl. No.: 204,181

[52] U.S. Cl. ................................ 210/180, 210/184
[51] Int. Cl. ............................................. B01d 35/18
[58] Field of Search .................... 210/180, 185, 184, 210/243, 498

[56] References Cited
UNITED STATES PATENTS

| | | | |
|---|---|---|---|
| 3,550,781 | 12/1970 | Barrow | 210/180 |
| 3,616,885 | 11/1971 | Priest | 210/180 |
| 2,839,196 | 6/1958 | Schwalge | 210/180 |
| 3,241,677 | 3/1966 | Schmitz | 210/180 |

Primary Examiner—Samih N. Zaharna
Assistant Examiner—F. F. Calvetti
Attorney—Jerry J. Dunlap et al.

[57] ABSTRACT

A closed vessel having a vapor outlet at the top thereof and a liquid inlet at the bottom. Within the closed vessel is a heating plate having a plurality of specially configured fluid passageways extending therethrough with the plate partitioning the closed vessel into an upper chamber and a lower chamber. The apertures through the plate have non-uniform cross-sectional areas and open into upwardly extending bosses formed on the top of the plate. A plurality of cooperating lugs are provided on the plate and the internal wall of the vessel for indexing the position of the plate within the vessel to align points of contact between electrical connections carried by the wall of the vessel and by the plate.

9 Claims, 6 Drawing Figures

PATENTED SEP 4 1973 3,756,412
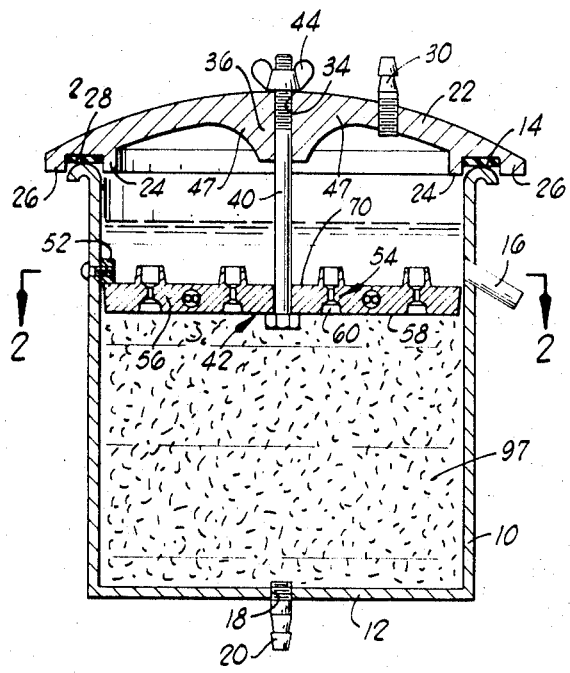
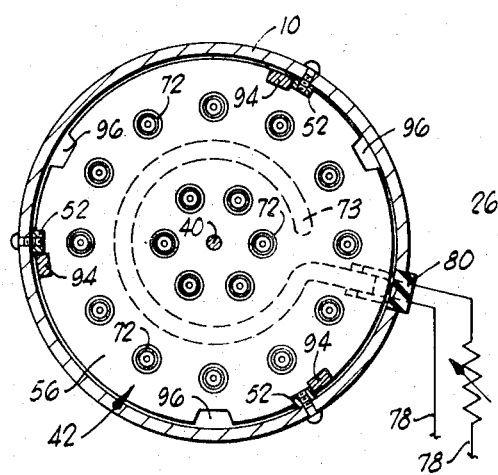
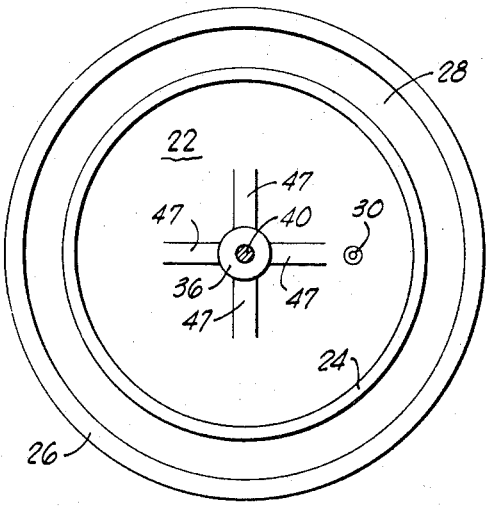
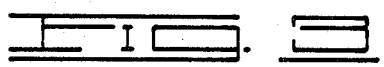
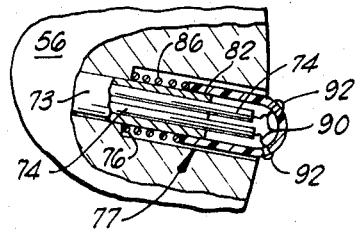
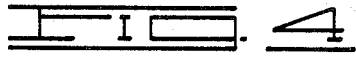
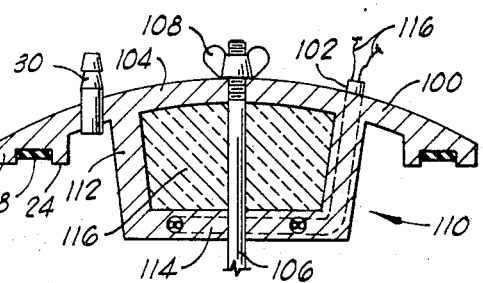
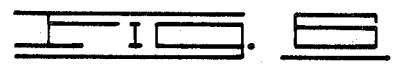
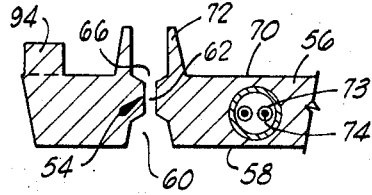
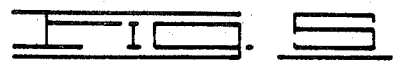

REMOVING CONTAMINANTS FROM A FLUID STREAM

BACKGROUND OF THE INVENTION

1. Field of the Invention

This invention relates to a device for continuously removing contaminants from a fluid stream, and more particularly, to a vessel in which heat and filtration techniques may be continually applied to a contaminated fluid contained therein for the purpose of yielding a purified vapor in an inexpensive and expedient fashion.

2. Brief Description of the Prior Art

In my U.S. Pat. No. 3,550,781, I disclose a vaporization plate and fluid filter system useful for removing solid contaminants from a contaminated liquid, such as residual greases and oils. The structure there disclosed includes a vessel which is closed during operation, though having a removable top or lid, and which is partitioned or divided into an upper and lower chamber by a perforated or apertured plate extending transversely across the vessel, and containing heater elements within the perforated plate. In the operation of the device described in my patent, a filter material is usually placed in the lower chamber formed within the vessel beneath the heated plate, and a contaminated fluid is then caused to flow into this bottom chamber through a fluid inlet in the bottom of the container. The heating of the plate dividing the vessel into the two chambers, conjunctively with the varied cross-sectional area of the apertures through this plate, results in the contaminated fluid being heated and a certain amount of the fluid moving through these apertures to the top of the heated plate. Here it is vaporized and the vapor is taken overhead through an opening formed in a removable lid which is tightly secured across the open upper end of the vessel during operation.

Although the described device for removing contaminants from a fluid stream works well in operation, I have now devised certain improvements which increase the efficiency of the device and its overall performance.

BRIEF DESCRIPTION OF THE PRESENT INVENTION

Broadly described, the present invention comprises a generally cylindrical container having a fluid inlet in the bottom thereof, and having a removable lid which has a fluid outlet or vapor discharge conduit therein. A rigid metallic plate is provided within the cylindrical vessel and is generally circular in peripheral configuration. The plate, in a preferred embodiment of the invention, carries a resistance heating element which is arranged for electrical contact with a suitable contact terminal located in the side wall of the vessel at a time when the plate is indexed by the cooperation of lugs carried on the plate and lugs carried on the internal wall of the vessel. The heating plate is provided with a plurality of fluid passageways therethrough, with each of the several passageways having a relatively large opening at the lower side thereof adjacent the lower surface of the plate, a constricted or small diameter orifice communicating with the large opening or aperture, and a second relatively large opening or aperture in the top side of the plate communicating with the other end of the restricted passageway or opening therebetween. Surrounding each of the apertures or openings at the top surface of the plate is an upwardly extending circular boss.

The heating plate also carries a plurality of integrally formed lugs projecting upwardly from the top of the plate and functioning to allow the heating plate to be indexed to a proper position for establishing the electrical connection with the contact carried in the side wall of the vessel.

The lid of the plate is provided with a double flange adjacent the outer peripheral edge thereof and a gasket interposed between the two flanges of the double flange for sealingly engaging a rolled-over or turned-down top edge formed at the upper side of the vessel. The cover further is provided with a downwardly extending tubular boss, through which is extended a connecting bolt for interconnecting the heating plate with the cover. The upper end of the bolt is threaded and is engaged by a wing nut which forces the cover down against the upper edge of the vessel. A plurality of braces surround the tubular boss extending down from the center of the cover for reinforcement of the cover.

An important object of the present invention is to provide a vaporization and fluid filter device which is simple in construction and efficient in its function of vaporizing a contaminated oleaginous material so as to permit relatively pure vapor to be recovered and the contaminants removed from such material.

Another object of the invention is to provide a device for removing contaminants from a fluid stream by efficient heating of a thin film of the fluid to vaporize the fluid, and by concurrently straining or filtering the fluid to remove solid contaminants therefrom.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a vertical sectional view through the apparatus of the invention.

FIG. 2 is a sectional view taken along line 2—2 of FIG. 1.

FIG. 3 is a bottom plan view of the removable cover used in the apparatus of the present invention.

FIG. 4 is an enlarged, detailed view of a portion of the heating means shown in FIG. 2 wherein the details of an electrical contact assembly are disclosed.

FIG. 5 is an enlarged detail view illustrating the localized structure of the heating plate used in the invention at the situs of one of the fluid passageways formed through the heating plate.

FIG. 6 is an enlarged detail view of certain modified structure used in a modified embodiment of the invention, and showing certain parts in section and certain parts in elevation.

DETAILED DESCRIPTION OF A PREFERRED EMBODIMENT OF THE INVENTION

Referring initially to FIG. 1 of the drawings, shown therein is a vessel 10 of generally cylindrical configuration having an open top and being closed at its bottom by an integrally formed bottom plate 12. At its upper edge, the vessel 10 has a rolled or turned over edge 14 which presents a concave upwardly facing surface. Projecting from the side of the vessel 10 is a discharge spout 16. Extending through the bottom plate 12 of the vessel 10 is an opening 18 into which is threaded a fitting 20 which facilitates the attachment to the vessel of a fluid charging conduit (not shown) for introducing a contaminated liquid to the interior of the vessel.

The open upper end of the vessel 10 is closed in usage by a dome-shaped cover 22 of concavo-convex cross-sectional configuration. The cover 22 is provided at its outer peripheral edge with a pair of horizontally spaced annular flanges 24 and 26 which carry therebetween, a gasket 28. The gasket 28 functions to sealingly engage the turned-down upper edge 14 of the vessel 10 at a time when the cover 22 is secured in position in a manner hereinafter described.

The cover 22 has threaded into an opening formed therein, an L-shaped discharge vent pipe or conduit 30 which is bent through a right angle and adapted for communicating a vapor receiving discharge line with the interior of the vessel 10 when the cover is secured in place thereon. The cover 22 further has an opening 34 formed centrally therein and communicating with the bore through a rigid tubular boss 36 extending downwardly from the cover. The boss 36 and opening 34 accommodate a retainer bolt 40 which is extended through a heater plate means 42 hereinafter described in greater detail, and which carries a tightening wing nut 44 at its threaded upper end adjacent the cover 22. A plurality of structural braces 47 flare outwardly from the tubular boss 36 and engage the cover 22 to provide reinforcement therefor at a location where the cover is most heavily stressed by tensioning of the bolt 40 during operation of the apparatus of the present invention.

At a plurality of circumferentially spaced locations around the vessel 10 and in approximate horizontal alignment with the discharge spout 16, a plurality of retaining lugs 52 are detachably secured to the interior surface of the wall of the vessel 10 and provide stops for the purpose of indexing or registering the heater plate means 42 in a desired position as hereinafter described.

The heater plate means 42 is provided with a plurality of fluid passageways 54 formed therethrough, and these are cross-sectionally configures as best illustrated in FIGS. 1 and 5 of the drawings. Thus, each of these passageways 54 includes a relatively large, trapezoidally shaped aperture which opens upwardly into the plate proper 56 from the lower surface 58 thereof, such trapezoidally shaped, relatively large aperture being designated by reference numeral 60. Each trapezoidally shaped aperture 60 communicates with a relatively small orifice 62 which passes upwardly through the central portion of the plate 56 and communicates with a relatively large aperture or recess 66 formed downwardly in the upper surface 70 of the plate. Surrounding each of the recesses 66 is an annular boss 72 which is of diminishing cross-sectional thickness from its base, where it projects from the surface 70 of the plate 56, to its free upper extremity. Stated differently, each of the bosses has a frusto-conically shaped outer peripheral surface. A plurality of the thus described variable cross-sectioned passageways 54 through the plate 56 are formed in an array or pattern of the type shown in FIG. 2.

Embedded in the plate 56 is a resistance heating element which may include, in one embodiment of the invention, a thermally conductive tubular member 73 which contains a looped electrical resistance heating element 74. The heating element 74 is encapsulated in the thermally conductive, electrically insulating tubular member 73, and the tubular member is embedded within the plate 56 in a substantially O-shaped tunnel, the outer end of which is enlarged to form a step 76 as most clearly shown in FIG. 4.

A contact assembly 77 is carried at the outer end of the looped resistance heating element 74 for providing positive electric contact with a pair of conductors 78 which terminate on the inner portion of a dimple formed on the inner side of a block 80 of electrically non-conductive material. The block 80 is secured in the side wall of the vessel. The contact assembly 77 includes a blind nipple 82 formed of electrical insulating material and telescoped over the outer ends of heating element loop 74. A compression spring 86 bears against the open end of the blind nipple 82, and also against the step 76 whereby the blind nipple is urged outwardly away from the plate 56 toward and into the dimple in the block 80 when the plate is properly aligned. Lead wires 90 are connected to the free ends of the looped electrical resistance heating element 74 and pass through the closed portion of the nipple 82 where they terminate in electrical contacts 92.

Carried on the upper side of the plate 56 of the heater plate means 42 are a plurality of indexing lugs 94. Also, a plurality of slots 96 are provided in circumferentially spaced relation around the outer periphery of the plate 56 to permit the plate to be passed by the retaining lugs 52 secured to the interior of the vessel 10. The indexing lugs 94 are arranged relatively to each other, and to the lugs 52 secured to the wall of the vessel so that when the indexing lugs abut the retaining lugs, the blind nipple 82 is biased into the dimple formed in the insulating block 80, and electrical contact is established to permit current to flow through the looped electrical resistance heating element 74. When the plate 56 is in its illustrated operative position, it divides the vessel into an upper chamber and a lower chamber. A fibrous filter material 97 is preferably positioned in the lower chamber during usage.

A portion of the structure included in a modified embodiment of the invention is illustrated in FIG. 6 of the drawings. In this embodiment of the invention, a lid assembly designated generally by reference numeral 98 is provided, and is shaped at its outer, generally circular periphery similarly to the lid structure or cover 22 illustrated in FIGS. 1-5. Thus, the annular flanges 24 and 26 are provided at the outer periphery of a dome-shaped cover 100 of concavo-convex cross-sectional configuration. In the case of the embodiment illustrated in FIG. 6, however, the cover 100 has a large circular aperture 102 formed in the center thereof, and a plate 104 is provided for closing this opening and for receiving the upper end of a bolt 106. The bolt 106 has its upper end threaded for receiving a wing nut 108 as in the previously described embodiment of the invention. The plate 104 which closes the circular opening 102 in the center of the lid has a beveled outer rim or periphery to mate with a registering beveled surface defining the opening through the cover 100.

Projecting downwardly from the cover 100 is a generally cylindrical heater assembly designated generally by reference numeral 110. The heater assembly 110 includes a side wall 112 and a bottom wall 114. The side wall 112 is secured to, or formed integrally with, the cover 100. The side wall 112 and bottom wall 114 of the heater assembly 110 have embedded therein, electrical resistance heating elements of the type hereinbefore described, and these heating elements have leads 116 extended therefrom for appropriate connection to a source of electrical power. In some usages of the cover assembly 98 shown in FIG. 6 of the drawings, it will be desirable to fill the hollow interior of the heating assembly 110 with a thermally insulating media 116 which will function to reduce heat radiation through the plate 104 which closes the opening 102 in the cover 100.

The structural components depicted in FIG. 6 may be used with or without a central partitioning plate containing heating elements and constructed in conformity with the plate 56 depicted in FIGS. 1–5. Stated differently, where the heating assembly depicted in FIG. 6 is employed, it may or may not, in differing circumstances, be necessary for the plate 56 to contain the embedded heating elements hereinbefore described. Basically, the purpose of providing the alternate construction shown in FIG. 6 is to eliminate the possibility of internal explosions or fire hazards when highly volatile liquids may be circulated through the upper chamber formed within the vessel, and which, upon vaporization, may be ignited from a spark from the electrical components of the plate 56 when such plate contains the resistance heating elements hereinbefore described.

In the operation of the apparatus of the invention, filter material 97 is initially placed in the lower portion of the vessel 10, and the plate 56 is then positioned in the vessel and is indexed to establish electrical communication between the looped electrical resistance element 74, and the electrical leads 78. The wing nut 44 is then tightened upon the retainer bolt 40 to secure the cover and heater plate 56 tightly in their operative positions. A contaminated fluid to be purified is then charged to the vessel 10 through the fitting 20 in the bottom of the vessel, with the contaminants of the fluid typically being constituted by water or solid particles. Contaminated fuel oils and other hydrocarbon or oleaginous type mixtures or suspensions are typical of those treated in the apparatus of the present invention. By means of a rheostat (not shown), the plate 56 is heated to a temperature such that the more voltatile components in the mixture, when brought up to that temperature, will be vaporized. The filter material 97 in the lower chamber within the vessel 10 filters out relatively large solid particles and heavy, non-volatile viscous liquids. The more volatile liquid passes upwardly through the fluid passageways 54 onto the upper surface of the plate 56. As the fluid spreads out on the upper surface of the plate, it is quickly heated to the temperature of the plate and is thereby vaporized. The vapor passes through the discharge spout 16 at the upper side of the plate and purified middle cut oil or other liquid material is removed from the vessel through the discharge spout 16.

An important usage of the apparatus of the invention is in the purification and reclamation of lubricating oil used in internal combustion engines. Here, the oil contains, after usage, solid contaminants, and also volatile liquid contaminants, including gasoline and water. The lubricating oil can be cleaned up or reclaimed by the removal of these contaminants by passing the oil through the filter material 97 to remove the solid contaminants therefrom, and then passing the oil upwardly through the apertures 60, the orifices 62 and through the annular bosses 72. By controlling the rate of flow of the oil through this path, the oil may be made to gravitate slowly in a thin film down the frusto-conically shaped outer peripheral surfaces of the bosses. This flow is desirable in that by providing a thin oil film in this manner and at this location, a considerably better opportunity is provided for the volatile impurities in the lubricating oil (i.e. gasoline and water) to be vaporized therefrom by heat applied, either through the heating element located in the plate 56, or in the cover 100, of the apparatus. Moreover, the provision of the tubular bosses 72 has the advantage of preventing or obviating localized gravitational accumulation of the lubricating oil in a pool or rather thick film, which is a phenomenon which occurs when elongated channels of the type depicted and described in Schwalge U.S. Patent 2,839,196 are employed.

Although certain preferred embodiments of the invention have been herein described in order to illustrate the principles of the invention, it will be understood that certain modifications in structure can be effected without departing from these principles. Such modifications are therefore deemed to be circumscribed by the spirit and scope of the invention except as the same may be necessarily limited by the appended claims or reasonable equivalents thereof.

What is claimed is:

1. Apparatus for removing contaminants from a liquid comprising:

a cylindrical vessel;

a plate dividing said vessel into an upper chamber and a lower chamber, said plate having a plurality of passageways formed therethrough, each of said passageways including a relatively large first opening at the lower side of said plate, and an orifice extending upwardly from said relatively large first opening toward the top of said plate;

tubular bosses projecting upwardly from the upper side of said plate and each defining an aperture communicating with one of said orifices so that a liquid may flow through each passageway in said plate, and then through one of said bosses to the top thereof, said bosses each having an inclined outer side wall of frusto-conical configuration down which liquid may flow by gravity to the top side of said plate after passing through the respective boss to the top thereof, whereby a large surface area of a thin film of liquid is exposed as liquid flows over the collective external surface areas of said bosses without said liquid channeling by gravity to a localized accumulation;

means for heating liquid flowing in a thin film down the inclined, frusto-conical side walls of the bosses to vaporize volatile components of said liquid;

a discharge spout projecting from the wall of said vessel and registering with an opening therethrough immediately above said plate;

a lid covering and closing the open upper end of said vessel;

means detachably interconnecting said lid and plate for retaining the lid and plate in said vessel;

a vapor discharge conduit secured to said lid and opening into said upper chamber; and an inlet fitting connected to the bottom of said vessel for introducing a contaminated liquid to said lower chamber.

2. Apparatus as defined in claim 1 and further characterized as including a looped electrical resistance heating element extending in at least one convolution within said plate for heating the plate, said heating element extending between and adjacent said passageways and being spaced substantially equidistantly from each of said passageways.

3. Apparatus as defined in claim 1 and further characterized as including generally cylindrical heating means projecting downwardly from a central portion of said lid, said heating means including:
- a lower plate extending substantially parallel to said first mentioned plate;
- a cylindrical side wall interconnecting said lower plate with said lid; and
- an electrical resistance heating element in said lower plate and extending through said cylindrical side wall for connection outside said vessel to a source of electrical power.

4. Apparatus as defined in claim 1 wherein said means detachably interconnecting said lid and plate comprises:
- a bolt extended through the center of said plate and the center of said lid; and
- a wing nut threadedly engaging the upper end of said bolt above said lid.

5. Apparatus as defined in claim 2 and further characterized as including a contact assembly for furnishing electrical current to said electrical resistance heating element, said contact assembly including means for connecting a source of electrical energy through a wall of said vessel to said electrical heating element.

6. Apparatus as defined in claim 5 wherein said lid is characterized in having a circular outer periphery and in further having a pair of radially spaced, downwardly projecting flanges adjacent the outer peripheral edge thereof and defining a channel between said flanges, said lid having a concavo-convex cross-sectional configuration;

and wherein said apparatus is further characterized in including:
- a gasket positioned in the channel between said flanges; and
- a turned over lip at the upper end of said cylindrical vessel sealingly engaging said gasket.

7. Apparatus as defined in claim 6 and further characterized as including:
- a second tubular boss projecting downwardly from the center of said lid; and
- a plurality of spaced braces extending radially outwardly from said second tubular boss and positioned in the angle formed between said second tubular boss and said lid.

8. Apparatus as defined in claim 7 wherein said means detachably interconnecting said lid and plate comprises:
- a bolt extended through the center of said plate, through the hollow interior of said second tubular boss and through the center of said lid; and
- nut means threadedly engaging the upper end of said bolt above said lid.

9. Apparatus as defined in claim 8 wherein said means for connecting a source of electrical energy to said electrical heating element includes:
- a blind nipple of electrical insulation material telescoped over one end of the looped electrical resistance heating element;
- lead wires passing through the closed end of the blind nipple and attached to the looped heating element; and
- resilient means seated between a portion of said plate and the open end of said blind nipple for pressing the end of the lead wires carried by the nipple into engagement with the source of electrical energy.

* * * * *